Patented Jan. 6, 1948

2,433,851

UNITED STATES PATENT OFFICE 2,433,851

POUR POINT DEPRESSANT

Eugene Lieber, West New Brighton, Staten Island, N. Y., assignor to Standard Oil Development Company, a corporation of Delaware No Drawing. Application November 13, 1942, Serial No. 465,457

13 Claims. (Cl. 252—52)

This invention relates to a novel type of chemical product and to methods of preparing same by chemical condensation, and to methods of using same, more particularly as a pour depressor in a waxy mineral lubricating oil.

Broadly the invention comprises the production of a wax-modifying agent by condensation of a lower aldehyde, by which is meant an aldehyde having 1 to 10 carbon atoms, preferably 2 to 8 carbon atoms. The term "condensation" is intended to include building up high molecular weight molecules by joining together a plurality of low molecular weight ones either by the true polymerization (i. e., without loss of any atoms from the molecule) or by auto-condensation, as for instance by the removal of $H_2O$ during the reaction.

The aldehyde constituting the sole reactant may be either aliphatic or aromatic or mixed aromatic-aliphatic, and, if aliphatic, it may be either saturated as in the case of octaldehyde, butyraldehyde, valeric aldehyde, acetaldehyde, etc., or unsaturated as in crotonic aldehyde, acrylic aldehyde. Other specific examples include benzaldehyde, cinnamic aldehyde, paraldehyde, etc. Two or more aldehydes may be used together or one after the other.

The condensation is preferably carried out in the presence of a condensation catalyst which is preferably of the Friedel-Craft type such as aluminum chloride, boron fluoride, zinc chloride, ferric chloride, titanium tetrachloride, stannic chloride, and the like, although if desired, other catalysts may be used such as a 10% solution of sodium hydroxide in alcohol.

The invention is preferably carried out in the presence of an inert solvent or diluent which may be either a hydrocarbon liquid such as a highly refined and substantially inert kerosene or heavy naphtha, or a chlorinated hydrocarbon solvent such as tetrachlorethane and ortho-dichlorbenzene.

The condensation should be carried out within a temperature range of about 50°–300° F. and generally about 100°–200° F., with a reaction time ranging from about ½ hr. to 10 hrs. or more, preferably about 1 to 5 hours. Although the invention is ordinarily carried out under atmospheric pressure, super-atmoshperic or sub-atmospheric may be used, if desired.

The amounts of materials to be used will, of course, vary to some extent according to the types of materials and reaction conditions but normally the amount of catalyst should be about .05–3.0 mols, preferably 0.1–1.0 mol, per mol of aldehyde reactant. The amount of solvent should be about 50% to 500%, preferably 100% to 300%, based on the weight of the aldehyde reactant.

In carrying out the invention, it is ordinarily preferred to mix the catalyst with the solvent first at about room temperature and then gradually add the aldehyde, and then slowly raise the temperature to the desired operating temperature which should then be maintained for the desired length of time as indicated above.

Slight differences in the potency of the product may result when the proportions of materials and reaction conditions are varied within the limits hereinabove described, and the optimum proportions and conditions for any particular aldehyde reactant may be readily determined by laboratory tests. If desired, the order of procedure of mixing the materials may be varied, as for instance, by first mixing the solvent and aldehyde and then adding the catalyst, preferably gradually, and if two or more aldehydes are used, one of them may be reacted first and then the other, as will be illustrated later in the experimental data.

After the desired condensation reaction has been completed, the catalyst should be neutralized or hydrolyzed and removed and this may be accomplished by cooling the mixture and adding dilute aqueous caustic soda or dilute hydrochloric acid or alcohol, or a mixture of any of these neutralizing agents, before or after diluting and extracting the reacting products with a substantial amount, such as 1 to 5 volumes of a suitable, inert, volatile solvent or diluent, such as a highly refined kerosene or heavy naphtha. The catalyst sludge may then be removed by settling or centrifuging and the solvent layer may be subjected to distillation to remove both the inert solvent used during the reaction as well as any solvent or diluent added after the reaction has been completed. This distillation is preferably carried out under reduced pressure, e. g., by steam distillation or vacuum distillation up to a temperature of about 500° F. or 600° F., the reduced pressure used being equivalent to an absolute pressure at least as low as 50 mm. mercury at 500° F.

The distillation residue is the desired product and it will ordinarily have a physical texture or consistency ranging from a heavy oil to a soft or even hard resin and will have a color ranging from yellow or red to a dark brown. This auto-condensation product has wax-modifying properties. i. e., it has the ability to modify the crystal structure of waxes, such as paraffin wax when added in small amounts to compositions containing the same. For instance, when about 0.1% to 5%, preferably 0.5% to 3.0%, of this wax modifier is added to a waxy lubricating oil, such as a Pennsylvania type lubricating oil having a relatively high pour point, the resultant blend will have a substantially lower pour point; in other words, this wax modifier is an effective pour depressor for waxy oil. A small amount of this wax modifier is also useful as a dewaxing aid for removing wax from mineral lubricating oils of undesirably high wax content. In similarly small amounts, this wax modifier may also be incorporated into paraffin wax, or compositions containing the same, to be used for various purposes such as for coating or impregnating paper, etc., or for making various molded products.

For the sake of illustration, but without limiting the invention to the particular materials used, the following experimental data are given:

Eight different tests were made in which the amount of aluminum chloride shown was dispersed in 300 cc. of a highly refined kerosene as a solvent and then the aldehyde was added at room temperature and heated to 150° F. for 4 hours. The reaction mass was then cooled and diluted by adding some more refined kerosene (using about 75% based on the volume of the reaction mass) and then the residual catalyst was neutralized or hydrolyzed by adding a mixture of isopropyl alcohol and water (in equal volume) and the mixture was allowed to settle into a lower catalyst sludge layer, and an upper kerosene layer which was decanted and distilled with fire and steam up to about 500° to 550° F. in order to remove kerosene, together with any unreacted aldehyde raw material as well as any low boiling products which might have been formed, thereby leaving the desired high molecular weight polymerization product as distillation residue. This product was tested for pour depressor potency in both 2% and 5% concentrations in a Pennsylvania lubricating oil base stock having a pour point of +30° F.

tive in concentrations of 11% to 33%, based on the weight of the principal aldehyde.

It is not intended that this invention be limited to the specific examples which are given merely for the sake of illustration but only by the appended claims in which it is intended to claim all novelty inherent in the invention as well as all modifications coming within the scope and spirit of the invention:

I claim:

1. The process which comprises subjecting to condensation 1 mol of an aldehyde selected from the class consisting of lower aldehydes having not more than 8 carbon atoms and having the general formula RCHO where R is selected from the group consisting of alkyl hydrocarbon radicals and aryl hydrocarbon radicals in the presence of 0.1 to 1.0 mol of a Friedel-Crafts catalyst in inert solvent at a temperature of 50–300° F., and recovering from the reaction mixture a high molecular weight condensation product soluble in mineral oils and substantially non-volatile under reduced pressure up to 500° F.

2. The process which comprises auto-condensing one mol of a lower aldehyde having not more than 8 carbon atoms and having the general formula RCHO where R is selected from the group consisting of alkyl hydrocarbon radicals and aryl hydrocarbon radicals in the presence of 0.1 to 1.0 mol of aluminum chloride catalyst, and in the presence of an inert solvent, at 100–200° F., to produce a high molecular weight condensation product soluble in waxy mineral lubricating oil, hydrolyzing and removing the catalyst and distilling the reaction products under reduced pressure to 500° F. to recover the desired product as distillation residue.

3. The process which comprises dispersing 0.1 to 1.0 mol of aluminum chloride in an inert solvent, and adding at room temperature one mol of a saturated aliphatic aldehyde having 4 to 8 carbon atoms to said dispersion, the amount of solvent used being 50 to 500% based on the

*Pour depressants by condensation of aldehydes*

| Test No. | Reagents | | | Yield | ° F. Pour Test | | Product Description |
|---|---|---|---|---|---|---|---|
| | Aldehyde | Gms. Used | Gms. AlCl₃ | | 2.0% | 5.0% | |
| 1 | Octaldehyde | 200 | 35 | 69 | +5 | −20 | Red Oil. |
| 2 | Octaldehyde | 200 | 70 | 88 | +20 | −10 | Do. |
| 3 | Butyraldehyde² | 200 | 100 | 74 | +15 | −10 | Dark Brown Oil. |
| 4 | Benzaldehyde | 200 | 50 | 5 | −20 | −35 | Soft Brown Resin. |
| 5 | Benzaldehyde | 200 | 100 | 36 | −5 | −15 | Brown Hard Resin. |
| 6 | {Octaldehyde / Crotonaldehyde¹ | 180 / 20 | 35 | 62 | −5 | −15 | Brown Oil. |
| 7 | {Octaldehyde / Crotonaldehyde¹ | 180 / 20 | 35 | 77 | +10 | −15 | Do. |
| 8 | {Benzaldehyde / Crotonaldehyde¹ | 212 / 70 | 88 | 73 | −15 | −25 | Yellow Resin. |

¹ The crotonaldehyde was added after the other aldehyde had been reacted.
² In this test 500 cc. of solvent were used instead of 300 cc., and the reaction time was 3 hours instead of 4 hours These tests show that the various aldehydes used can be successfully condensed to make a product having the texture of an oil or a resin and having the ability to lower the pour point of a waxy mineral lubricating oil from +30° F. down to various points between +20° F. and −20° F. when used in 2% concentration, and between −10° F. and −35° F. when used in 5% concentration. These results are very remarkable because never heretofore have pour depressors been obtained from this type of raw material. As indicated in tests Nos. 6, 7 and 8 in the above table, the crotonaldehyde was effecweight of the aldehyde reactant, heating the mixture to 100–200° F. for ½ hour to 10 hours, hydrolyzing and removing the aluminum chloride catalyst and distilling the reaction products with fire and steam up to 500–550° F. to obtain the desired product as distillation residue.

4. The process which comprises dispersing 35 to 70 parts by weight of aluminum chloride in 300 cc. of a refined inert kerosene and adding at room temperature 200 parts by weight of octaldehyde to said dispersion, heating the mixture to 150° F. for 4 hours hydrolyzing and removing the aluminum chloride catalyst and distilling the reaction products with fire and steam up to 500° F. to obtain the desired product as distillation residue.

5. The process which comprises subjecting 212 parts by weight of benzaldehyde to auto-condensation in the presence of 88 parts by weight of aluminum chloride catalyst and in the presence of 300 cc. of refined inert kerosene, and using a reaction temperature of 150° F., and after said benzaldehyde has been reacted, adding 70 parts by weight of crotonaldehyde and continuing the reaction, and finally hydrolyzing and removing the catalyst and distilling the reaction products with fire and steam up to about 500° F. to obtain the desired product as distillation residue.

6. High molecular weight product comprising essentially an aldehyde condensation product derived by the process defined in claim 1, having a texture ranging from a viscous oil to a hard resin, being soluble in waxy mineral lubricating oils and substantially non-volatile up to 500° F., and having the property of depressing the pour point of waxy mineral lubricating oils when added thereto in small amounts.

7. The process which comprises dispersing 0.1–1.0 mol of aluminum chloride in a refined inert kerosene and adding at room temperature 1 mol of benzaldehyde to said dispersion, the amount of kerosene used being 100% to 300% by weight based on the benzaldehyde used, heating the mixture to 150° F. for 4 hours, hydrolyzing and removing the aluminum chloride catalyst and distilling the reaction products with fire and steam distillation up to 500° F. to obtain the desired product as distillation residue.

8. The product of the process defined in claim 6, said product having a texture ranging from a viscous oil to a hard resin, being soluble in mineral oil, and having the property of depressing the pour point of a waxy mineral lubricating oil when added thereto in a small amount.

9. A composition comprising at least a substantial amount of wax and comprising at least a waxy-modifying amount of a product of the process defined in claim 1.

10. A lubricant comprising a waxy mineral lubricating oil and about 0.1–5% of the product of the process defined in claim 2.

11. A lubricant comprising a waxy mineral lubricating oil and about 0.5–3% of the product of the process defined in claim 4.

12. A lubricant comprising a major proportion of a waxy mineral lubricating oil and a small but pour-depressing amount of the product of the process defined in claim 7.

13. A high molecular weight Friedel-Crafts auto-condensation product derived by subjecting benzaldehyde to a temperature of 50° to 300° F. by the process of claim 1, said product being soluble in waxy mineral lubricating oils and substantially non-volatile under fire and steam distillation up to about 500° F.

EUGENE LIEBER.

REFERENCES CITED

The following references are of record in the file of this patent:

UNITED STATES PATENTS

| Number | Name | Date |
| --- | --- | --- |
| 1,933,716 | Day | Nov. 7, 1933 |
| 2,302,403 | Tetley | Nov. 17, 1942 |
| 2,216,941 | Gleason | Oct. 8, 1940 |
| 1,596,971 | Hermann | Aug. 24, 1926 |
| 1,767,759 | Hermann | June 24, 1930 |
| 2,212,894 | Allen | Aug. 27, 1940 |
| 2,274,749 | Smyers | Mar. 3, 1942 |
| 1,665,233 | Trickey | Apr. 10, 1928 |

OTHER REFERENCES

Shiff "Ber. Deut. Chem. Ges.," vol. 3, page 413 (1873).

Lippman et al., Ibid., vol. 38, page 1629 (1905).

Ellis, Chemistry of Synthetic Resins, vol. 1, Reinhold, 1935, page 502.